Patented Nov. 11, 1924.

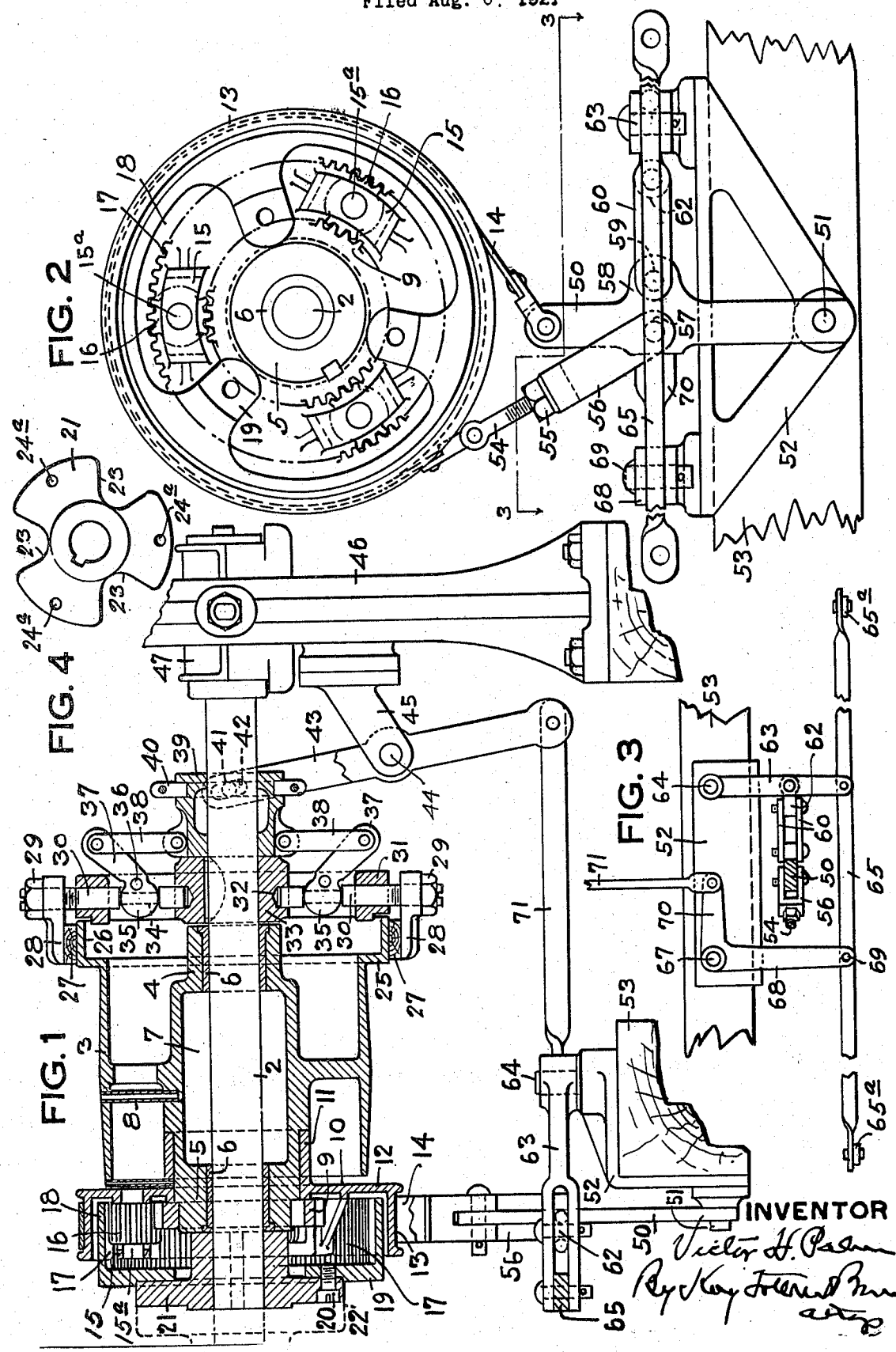

1,515,068

UNITED STATES PATENT OFFICE.

VICTOR H. PALM, OF BUTLER, PENNSYLVANIA, ASSIGNOR TO BUTLER ENGINE AND FOUNDRY CO., OF BUTLER, PENNSYLVANIA, A COPARTNERSHIP COMPOSED OF HENRY B. MacKINNEY, MONT M. MacKINNEY, JOHN J. MacKINNEY, SARAH G. MacKINNEY, AND LYDIA A. MacKINNEY.

REVERSE CLUTCH MECHANISM.

Application filed August 6, 1921. Serial No. 490,403.

*To all whom it may concern:*

Be it known that I, VICTOR H. PALM, a citizen of the United States, and resident of Butler, in the county of Butler and State of Pennsylvania, have invented a new and useful Improvement in Reverse Clutch Mechanism; and I do hereby declare the following to be a full, clear, and exact description thereof.

My invention relates to reverse clutch mechanism of the type in which a pulley or other driven member may be driven in either direction from a driving member which rotates continuously in one direction.

The object of my invention is to simplify and improve the construction of reverse clutch mechanism of the character indicated.

The accompanying drawing shows my invention as applied to a pulley which is required to rotate alternately in opposite directions, as in the operation of well drilling tools. It is to be understood, however, that the driven member may be a shaft or other rotatable element instead of a pulley.

In the accompanying drawing Fig. 1 is a side view, partly in elevation and partly in section, showing a pulley equipped with a reversing clutch mechanism constructed in accordance with my invention; Fig. 2 is an end elevational view taken from the left of Fig. 1, with the driving coupling removed; Fig. 3 is a fragmentary plan view, with parts in section, showing the operating levers and connections; and Fig. 4 is a reduced end view of the driving coupling.

The construction shown in the drawing comprises a drive shaft 2 driven from any suitable source of power, not shown, and a pulley 3 mounted loosely on the shaft 2 by means of bearing sleeves 4 and 5, suitable bearing bushings 6 being interposed between the sleeves 4 and 5 and the shaft 2. The hub of the pulley 3 may contain a lubricating chamber 7 surrounding the shaft 2, and provided with a filling tube 8.

A gear wheel 9 is keyed to the outer end of the hub sleeve 5 of the pulley 3, and the sleeve 5 also serves to support a brake wheel 10 which consists of a sleeve 11, loosely surrounding the hub sleeve 5 of the pulley, a plate 12 carried by the sleeve 11, and a flange 13 extending around the periphery of the plate 12, the flange 13 being surrounded by a brake band 14.

The plate 12 of the brake wheel also carries one or more bearing brackets 15. Pins 15$^a$ are carried in bearings in the plate 12 and in the brackets 15, and pinions 16 are mounted on the pins 15$^a$. Three of these sets of pins and pinions are shown in the drawing, and all of the pinions 16 mesh with the gear wheel 9 and with an internal gear 17 formed on the inside of a ring 18 which is in telescoped relation to the flange 13 of the brake wheel 10. The gear ring 18 is provided with three spoke arms 19 which extend toward the shaft 2 and are secured by means of screw bolts 20, or otherwise, to a coupling 21 that is rigidly secured to the driving shaft 2. A second coupling 22, shown at the left of Fig. 1 may cooperate with the coupling 21 to drive the shaft 2 from any convenient source of power. The coupling 21 is preferably made in the scolloped form shown in Fig. 4, recesses 23 being formed between the projections 24, and openings 24$^a$ being formed in the projections 24 for bolting the coupler 21 to the spoke arms 19. The recesses 23 permit the internal gear ring 17, with its spoke arms 19, to be removed without detaching the coupler 21 from the shaft 2, by removing the attaching bolts, turning the gear ring one-sixth of a revolution and then drawing it off, the arms 19 passing through the openings 23 in the coupler 21.

The pinions 16, together with the external gear 9 and the internal gear 17, form a system of planetary gearing for driving the pulley 3 in a reverse direction with respect to the shaft 2, the gearing being effective for this purpose when the brake wheel 10 is prevented from rotating by means of the brake band 14 in the manner described below.

In order to rotate the pulley 3 in the same direction and at the same speed as the shaft 2, a friction clutch mechanism is provided at the right of the pulley, as seen in Fig. 1. The pulley is provided with a flange 25 which supports a friction ring 26 somewhat larger in diameter than the pulley 3. Clutch shoes 27 of friction material are mounted adjacent to the friction ring 26, and are carried by arms 28, adjustable by means of nuts 29 on screw-threaded pins 30 which extend slidably through radial openings in a ring 31. The inner ends of the pins 30 are received in a groove 32 in a collar 33 which is keyed to the driving shaft 2. A short distance from the inner end of each of the pins 30 is a reduced portion 34 in which is seated a circular eccentric cam member 35 pivoted on a pin 36 having its ends supported in the ring 31. The cam member 35 has an extension 37 which is connected by means of a link 38 to a collar 39 loosely and slidably mounted on the driving shaft 2. The collar 39 has a groove in which is a split ring 40 having pins 41 extending from opposite sides and received in slots 42 in the forked upper end of an operating lever 43 which is pivotally supported at 44 on an arm 45 carried by a standard 46, which also supports a bearing 47 for the shaft 2.

When the friction clutch grips the pulley to rotate it with the shaft, the brake band 14 is loose, permitting the brake wheel 10 and the planetary gear system to also rotate with the shaft, and when on the contrary the brake band 14 is tight the friction clutch is released. In order to connect these parts together so that when one operates the other is simultaneously thrown out of operation, the brake band and the friction clutch are connected together by means of the following operating mechanism.

One end of the brake band 14 is connected to the upper end of a vertical lever plate 50 which is pivoted at 51 to a yoke 52 secured to a stationary beam 53. The other end of the brake band 14 is secured to an eye-bolt 54 which is adjustably secured by means of a lock nut 55 to a clevis 56 which is pivotally attached at 57 to both sides of the lever 50. Adjacent to the pivot 57 the lever 50 has a lateral extension 58 through which extends a pin 59 which also extends through the adjacent ends of two links 60. The links 60, together with a short link 62, connect the lever 50 with a horizontal lever 63, one end of which is pivoted at 64 to the yoke 52 secured to the stationary beam 53 and is pivoted at its other end to a horizontal bar 65 having hand levers 65ª attached to both of its ends. A bell crank lever is pivoted at 67 to the yoke 52 secured to stationary beams 53, and has one of its arms 68 pivotally connected at 69 to the horizontal bar 65, while its other arm 70 is pivoted to one end of a bar 71, the other end of which is attached to the lower end of the operating lever 43 of the friction clutch.

When the friction clutch is to be thrown in and the brake band released, the bar 65 is moved to the right, as shown in Fig. 3, by means of either of the hand levers 65ª, which movement is transmitted through the bell crank 68—70 to move the bar 71 to the right in Fig. 1, which operates through the lever 43 to slide the collar 39 to the left on shaft 2. When the reverse operation is desired, the bar 65 is moved to the left in Fig. 3, thus releasing the friction clutch, and, at the same time, rocking the lever plate 50 to the left, Fig. 2, which tightens the brake band 14 and so prevents the brake wheel 10 from rotating.

In the operation of the device described above, the shaft 2 is driven continuously in one direction. When it is desired to rotate the pulley in the same direction and at the same speed as the shaft 2, one of the hand levers 65ª is moved to slide the collar 39 to the left on the shaft 2, thereby rocking the cam members 35 on their pivots 36 and drawing the pins 30 inwardly toward the shaft 2 which forces the clutch shoes 27 against the clutch ring 26, thereby gripping the pulley 3 and causing it to rotate with the shaft. This is the position of the parts shown in the drawing, and the movement of the friction clutch is accompanied by a corresponding movement of the lever plate 50 which loosens the brake band 14 and permits the brake wheel and the planetary gearing to rotate with the shaft When it is desired to reverse the direction of the pulley 3 the operating lever is moved in the opposite direction, thereby moving the collar 39 to the right on the shaft 2 which depresses the extensions 37 of the cam members 35 and thereby moves the pins 30 outwardly and withdraws the clutch shoes 27 from the pulley. The same movement of the operating lever causes the lever 50 to rock to the left on its pivot 51 (Fig. 2), thereby tightening the brake band and preventing the brake wheel 10 and the pinion 16 from revolving around the shaft 2. Thereupon the continued rotation of the internal gear 17, which is rigidly carried by the shaft 2, rotates the pinions 16 on their individual axes, and this movement is communicated to the gear 9 which is rigidly carried by the pulley 3. Consequently, the pulley 3 is caused to rotate in the opposite direction with respect to the shaft 2.

As shown in the drawing, the proportions of the various gears are such that the pulley is rotated in its reverse direction at a speed one and three-fourths times the speed of rotation of the shaft 2. It is to be understood that various modifications may be made in the construction and arrangement of parts within the scope of my invention as defined in the appended claims.

I claim as my invention:

1. A reversing clutch mechanism comprising a shaft, a pulley mounted loosely on said shaft, a sleeve member mounted loosely on the hub of said pulley, a brake wheel carried by said sleeve beyond said pulley, a brake band surrounding said brake ring, a gear wheel secured to said hub, a coupling carried by said shaft, arms extending radially from said coupling, an internal gear wheel carried by said arms within said brake wheel, and a plurality of pinions carried by said brake wheel and meshing with both the said gear wheels.

2. A reversing clutch mechanism comprising a shaft, a pulley loosely mounted on said shaft and having an outwardly projecting hub, a sleeve member loosely surrounding a portion of said hub of said pulley, a plate carried by said sleeve beyond said pulley, a brake flange carried by said plate, a gear ring secured to the hub of said pulley at the side of said plate opposite to the working portion of said pulley, an internally toothed gear ring extending within said brake flange and rigidly connected to said shaft, and a pinion carried by said plate and meshing with both of said gear rings.

3. A reversing clutch mechanism comprising a shaft, a pulley loosely mounted on said shaft and having a hub projecting beyond the working surface of said pulley, a sleeve member loosely mounted on said hub, a plate carried by said sleeve, a brake flange carried by said plate, a gear ring secured to the hub of said pulley beyond said plate, an internally toothed gear ring, a coupling rigidly secured to said shaft and having projections separated by open spaces, arms carried by said internally toothed gear ring and removably connected to said projections on said coupler, whereby said gear ring may be removed from said coupler without detaching said coupler from said shaft, bearings carried by said plate and extending within said internally toothed gear ring, and a pinion mounted in said bearings and meshing with both of the said gear rings.

In testimony whereof, I, the said VICTOR H. PALM, have hereunto set my hand.

VICTOR H. PALM.

Witnesses:
ROBT. D. TOTTEN,
JOHN F. WILL.